Patented Mar. 4, 1952

2,587,650

UNITED STATES PATENT OFFICE 2,587,650

METHOD FOR DEFATTING STARCH

Carl E. Rist, Howard A. Davis, and Ivan A. Wolff, Peoria, Ill., assignors to the United States of America as represented by the Secretary of Agriculture No Drawing. Application July 25, 1950, Serial No. 175,848

10 Claims. (Cl. 127—71)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the defatting of starch, and more particularly to removing by extraction the fatty acid substances from starches by an improved method employing elevated temperatures and pressures.

Many commercially refined starches, particularly the cereal starches, such as corn starch, wheat starch, and rice starch, contain from 0.5 to 0.85 percent by weight of fatty acid substances. This fatty content is undesirable in many of the usual applications of starch. It has undesirable effects on the properties of starch pastes and solutions and is undesirable particularly in the separation of starch into its component polysaccharides. For the latter purpose it is occasionally desirable that the fatty content be an absolute minimum.

Known methods for defatting starch employ hydrophilic fatty acid solvents, such as methanol, ethanol, isopropanol, acetone, dioxane, butyl Carbitol or methyl Cellosolve. The prior method involves extraction with the solvents either by refluxing at atmospheric pressure, by hot or cold percolation or by digestion.

This prior method reduces the fatty acid content to 0.2 or 0.3 percent by weight fairly efficiently. Extraction for periods of time involving several days have reduced the fatty acid content to still lower values. The last 25 percent of the fatty substance, i. e., 0.2 percent on the basis of the starch, is removed very slowly by all prior methods known to us. Up to now, no method has produced starch having a fatty acid content below 0.15 percent but that has required many repetitions of tedious or time-consuming extractions.

Our researchers have revealed that the prior method previously noted, and exemplified in U. S. Patent No. 2,280,723 is not effective for obtaining defatted starches with fatty acid content below 0.15 percent for any single extraction. Repeated extractions reduce the fatty acid content very slowly to a minimum usually considerably above 0.10 percent, and continued repeated extraction does not appear to be further effective.

According to our process starch is extracted with a hydrophilic fatty acid solvent as disclosed in said patent as for example a lower aliphatic alcohol, such as methanol, ethanol and isopropanol, solvents such as acetone, dioxane, butyl Carbitol, methyl Cellosolve and the like. The solvents may be employed dry, but small amounts of water, as will be introduced by the normal water content of starch, up to 20 percent or 30 percent are not usually detrimental.

For the extraction step we use temperatures within the range of 105° C. to 125° C. and gauge pressures of 1 to 6 or more atmospheres (i. e. absolute pressures of 2 to 7 atmospheres or more). We have found it convenient to employ autogenic pressures in the case of the relatively volatile solvent. We have found that the fatty acid content of the starch can be reduced consistently to values below 0.10 percent by our process.

The following specific examples illustrate the invention. Example 1 illustrates the acknowledged prior method, showing the minimum of fatty acid content below which that method is incapable of going even by repeated extractions. Example 4 shows the improvement of starch partially defatted by other methods, and Example 5 shows the efficient defatting of a commercial starch in a one-step process. The fatty acid contents reported are on actual weights determined by the acid hydrolysis procedure, and are corrected to dry starch basis. The starch sample is hydrolyzed with hydrochloric acid and the hydrolyzate is extracted with petroleum ether. The residue after evaporation of the petroleum ether is reported as fatty acids. In each case, slightly lower values may be arrived at by titrating the extracted material with sodium hydroxide and calculating the results in terms of oleic acid.

EXAMPLE 1

Commercially refined corn starch (40 parts by weight) having a fatty acid content of 0.81 percent was given five successive extractions of 2 hours each by stirring with 120 parts by weight of 85 volume percent methanol. The temperature of the extractor was maintained at 70° C., just under the point of active reflux. The extracted starch was filtered hot between steps and fresh methanol was added for the next step. The results are tabulated below.

Table

| | Fat content |
|---|---|
| Original starch | 0.81 |
| After first extraction | 0.30 |
| After second extraction | 0.28 |
| After third extraction | 0.19 |
| After fourth extraction | 0.19 |
| After fifth extraction | 0.20 |

EXAMPLE 2

Air dry, commercially refined corn starch (65 grams) was mixed with 200 ml. of 85 percent methanol in a pressure-tight vessel. The vessel was sealed, and the mixture heated to 110° C. with constant agitation. The temperature was maintained for 3 hours. The vessel was then permitted to cool to 65° C. and opened, and the contents filtered while hot. The filter cake was washed with hot methanol. The treated starch contained 0.13 percent fatty acid by weight. The starch was treated by a second extraction as before, and the product contained 0.08 percent fatty acid. This was extracted a third time, and the product contained 0.03 percent fatty acids. The period of each successive treatment may be reduced considerably, as may be seen from the following example.

EXAMPLE 3

Commercially refined corn starch (65 grams) containing 0.66 percent fatty acids was successively extracted with fresh 200 ml. batch of 85 percent methanol as in Example 2 except that the period of each extraction at 110°–115° C. was reduced to one hour. The product of the third extraction step contained 0.03 percent fatty acids.

EXAMPLE 4

A 65-gram sample of partially defatted starch containing 0.14 percent fatty substances was extracted with 200 ml. of 85 percent methanol at 110° C. in a sealed container for three hours and the product was then filtered and dried. The product had a fatty acid content of 0.07 percent.

EXAMPLE 5

Example 4 was repeated, employing 65 grams of commercial corn starch containing 0.66 percent fat. After 3 hours at 110° C. the vessel was opened, and the treated starch filtered while hot and washed with hot 85 percent methanol. The product contained 0.12 percent fatty acids.

The procedures of the above examples are readily adaptable to continuous operation and/or to recycling and reuse of the extracting solvent. For example, the filtrate from Example 5 may be reused to extract more fatty acid and the cycle continued, with purification as by distillation as necessary. Moreover, the wash methanol may likewise be recycled in the same manner.

We claim:

1. The process which comprises extracting fatty acids from starches containing the same with a hydrophilic fatty acid solvent at a temperature within the range of 105°–125° C. and at a gauge pressure within the range of 1 to 6 atmospheres.

2. Process which comprises extracting fatty acids from starch with a hydrophilic fatty acid solvent for a period of 1 to 3 hours, removing the extract solution from the starch and re-extracting the starch with fresh hydrophilic fatty acid solvent for a period of 1 to 3 hours, removing the extract solution while hot from the starch and repeating the extraction step as before with fresh hydrophilic fatty acid solvent, at least the last extraction step being carried out at a temperature within the range of 105°–125° C. and at a gauge pressure within the range of 1 to 6 atmospheres.

3. The process which comprises extracting corn starch with methanol to remove the fatty acid content thereof, said extraction being carried out for a period of 1 to 3 hours at a temperature within the range of 105°–125° C. and at a gauge pressure within the range of 1 to 6 atmospheres.

4. The process which comprises extracting fatty acids from starches containing the same with a lower alkanol at about 105° to 125° C. under the autogenic pressure of the alkanol.

5. The process of claim 1 in which the solvent is 85% methanol.

6. The process which comprises extracting fatty acids from starches containing the same with methanol at about 105 to 125° C. under the autogenic pressure of methanol.

7. The process of claim 1 in which the solvent is acetone.

8. The process of claim 1 in which the solvent is dioxane.

9. The process of claim 1 in which the solvent is butyl Carbitol.

10. The process of claim 1 in which the solvent is methyl Cellosolve.

CARL E. RIST.
HOWARD A. DAVIS.
IVAN A. WOLFF.

REFERENCES CITED

The following references are of record in the file of this patent:

UNITED STATES PATENTS

| Number | Name | Date |
|---|---|---|
| 1,892,366 | Sato | Dec. 27, 1932 |
| 2,280,723 | Schoch | Apr. 21, 1942 |